Patented Oct. 8, 1929

1,731,071

UNITED STATES PATENT OFFICE

GUSTAVE E. LANDT AND WILLIAM H. ADAMS, JR., OF NORRISTOWN, PENNSYLVANIA, ASSIGNORS, BY MESNE ASSIGNMENTS, TO CONTINENTAL DIAMOND FIBRE COMPANY, OF NEWARK, DELAWARE, A CORPORATION OF DELAWARE

METHOD OF PREPARING A SYNTHETIC RESIN VARNISH

No Drawing. Original application filed January 4, 1927, Serial No. 159,014. Divided and this application filed August 31, 1927. Serial No. 216,787.

Our invention relates to a method of preparing a synthetic resin varnish and is a division of our application Serial No. 159,014, filed January 4, 1927, for "method of making hexamethylenetetramine".

One object of our invention is to provide a process for the manufacture of a synthetic resin varnish by which hexamethylenetetramine is prepared in the organic solvent vehicle in which the initial condensation product of the synthetic resin is to be dissolved, thereby obviating the necessity of separating the hexamethylenetetramine in a crystalline form and resulting also in a material saving in organic solvents.

At the present time, hexamethylenetetramine is prepared commercially by passing a stream of ammonia gas or a solution of ammonium hydroxide into a water solution of formaldehyde whereupon the ammonia and the formaldehyde react, liberating water and forming the hexamethylenetetramine. Hexamethylenetetramine is relatively soluble in water and therefore must be recovered by evaporation. In order that the hexamethylenetetramine may be in a purified crystalline form, it is redissolved in alcohol and recrystallized therefrom.

Our invention is characterized by the reaction of the formaldehyde and the ammonia in an organic solvent solution, thereby eliminating two steps now used in plant practice, namely, the evaporation of the water from the original reaction products and the subsequent recrystallization of the hexamethylenetetramine from the alcohol. We preferably employ as the organic solvent ordinary commercial alcohol which, as is well known, contains 5% of water. This small amount of water which is present in commercial alcohol and the amount of water formed chemically during the process is sufficient to keep the hexamethylenetetramine to some extent in solution. The formaldehyde may be dissolved in the alcohol and the gaseous ammonia passed therein or the process may be reversed by dissolving the ammonia in the alcohol and passing formaldehyde into it. A satisfactory method also results if both the formaldehyde and the ammonia are passed into the alcohol simultaneously. When the reaction is continued until the solution becomes saturated and the hexamethylenetetramine crystallizes out, then a continuous process for the manufacture of hexamethylenetetramine results from which the crystalline hexamethylenetetramine may be removed from the reaction mixture in a relatively pure condition and one which is ready for the market, while the reaction in the solution is continued.

In the preparation of hexamethylenetetramine from formaldehyde and ammonia, six mols of the former react with 4 mols of the latter to form the compound. The reaction may be represented as follows:

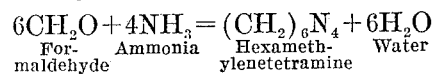

$$6CH_2O + 4NH_3 = (CH_2)_6N_4 + 6H_2O$$
For-    Ammonia    Hexameth-    Water
maldehyde          ylenetetramine Hence in the preparation of the compound according to the method here disclosed, the ratio of the two reacting components if they are to be passed simultaneously into the solution are kept approximately in this ratio. However, if one of the components is dissolved in the solvent, then the other is passed into the solution until the reaction is complete, whereupon more of the component in solution may be added and the process continued. The balancing of the ratio of the components is within the skill of one familiar with chemical preparations and will to some extent depend on the condition of operation, for example at times in order to insure a complete reaction it may be advisable to have present an excess of one of the reacting substances.

The synthetic resin industry in the manufacture of synthetic resin varnishes uses large quantities of alcohol in the preparation of these solutions. To this synthetic resin solution in alcohol oftentimes crystalline hexamethylenetetramine is added in order that a potentially reactive varnish will be formed by which term is meant one that can be converted by heat easily and quickly into a hard, infusible synthetic resin. By the use of the solution of hexamethylenetetramine herein described, the potentially reactive varnish can be prepared simply by adding the initial condensation product thereto without any recovery of the hexamethylenetetramine with its accompanying loss of alcohol. This direct step therefore is of great value in this industry for the manufacturers of synthetic resin varnishes may saturate the alcohol which is to be used as a solution in the manufacture of the varnish with the hexamethylenetetramine and there will be no subsequent losses either of the material or of the alcohol.

An optional method of preparing a synthetic resin varnish which has proved to be satisfactory comprises passing the gaseous reacting components, that is the formaldehyde and ammonia, into a solution of the synthetic resin in alcohol. In this case, the formaldehyde and ammonia will react to form hexamethylenetetramine in the varnish itself thereby rendering it potentially reactive. This particular process is specifically covered in an application filed even date herewith.

While the above processes are applicable for many types of synthetic resins, they are especially adapted for use with that type of synthetic resin known as phenolic condensation products, that is to say one in which a phenol is reacted with another compound such as formaldehyde, glycerine, furfural and the like.

Considerable modification in the proportions used and in the methods of carrying out the process are possible with no departure from the essential features of our invention.

We claim:

1. A process for preparing a synthetic resin varnish which comprises reacting ammonia and formaldehyde in an organic solvent in which it will react to form hexamethylenetetramine, and thereafter dissolving the initial condensation product of a synthetic resin in said solution to form a potentially reactive varnish.

2. A process for preparing a synthetic resin varnish which comrpises passing ammonia and formaldehyde into an organic solvent in which it will react to form hexamethylenetetramine, and thereafter dissolving the initial condensation product of a synthetic phenolic resin in said solution to form a potentially reactive varnish.

3. A process for preparing a synethic resin varnish which comprises reacting ammonia and formaldehyde into alcohol to form hexamethylenetetramine, and thereafter dissolving the initial condensation product of a phenolic resin in said solution to form a potentially reactive varnish.

4. A process for preparing a synthetic resin varnish which comprises passing ammonia and formaldehyde into alcohol to form hexamethylenetetramine, and thereafter dissolving the initial condensation product of a phenolic resin in said solution to form a potentially reactive varnish.

5. A process for preparing a phenolic resin varnish which comprises reacting ammonia and formaldehyde in alcohol containing a little water to form hexamethylenetetramine, and thereafter dissolving the initial condensation product of a phenolic resin in said solution to form a potentially reactive varnish.

GUSTAVE E. LANDT.
WILLIAM H. ADAMS, Jr.